United States Patent
Lee et al.

(10) Patent No.: US 10,400,409 B2
(45) Date of Patent: Sep. 3, 2019

(54) OIL COLLECTING APPARATUS AND OIL COLLECTING SYSTEM HAVING THE SAME

(71) Applicant: KOREA INSTITUTE OF SCIENCE AND TECHNOLOGY, Seoul (KR)

(72) Inventors: Heon Ju Lee, Seoul (KR); O Myoung-Woon Moon, Seoul (KR); O Chang Kwon, Seoul (KR); Do Hyun Kim, Seoul (KR); Tae Jun Ko, Seoul (KR); Ho-Young Kim, Seoul (KR); Hyungmin Park, Seoul (KR); Kyu Hwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/854,860

(22) Filed: Dec. 27, 2017

(65) Prior Publication Data
US 2018/0179717 A1 Jun. 28, 2018

(30) Foreign Application Priority Data
Dec. 28, 2016 (KR) .......................... 10-2016-0181523

(51) Int. Cl.
*E02B 15/04* (2006.01)
*C02F 1/40* (2006.01)
(Continued)

(52) U.S. Cl.
CPC ........ *E02B 15/048* (2013.01); *B01D 39/1692* (2013.01); *C02F 1/40* (2013.01);
(Continued)

(58) Field of Classification Search
CPC .... E02B 15/045; E02B 15/046; E02B 15/048; E02B 15/0814; E02B 15/0842;
(Continued)

(56) References Cited

U.S. PATENT DOCUMENTS 4,372,854 A * 2/1983 Szereday ............. E02B 15/106
210/242.3
4,381,994 A * 5/1983 Ayers .................... E02B 15/048
210/242.3
(Continued)

FOREIGN PATENT DOCUMENTS

JP 03-090494 A 4/1991
JP 1999-028459 A 2/1999
(Continued)

OTHER PUBLICATIONS

Korean Office Action dated Nov. 1, 2018.

*Primary Examiner* — Christopher Upton
(74) *Attorney, Agent, or Firm* — Rabin & Berdo, P.C.

(57) ABSTRACT

An oil-collecting apparatus includes: a body including an inlet through which a liquid is introduced, a first outlet through which purified water generated from the liquid introduced through the inlet is discharged, and a second outlet through which materials collected from the liquid are discharged; and a filter arranged at the first outlet of the body and generating the purified water by collecting the materials included in the liquid by allowing the liquid introduced through the inlet to pass therethrough.

18 Claims, 15 Drawing Sheets

(51) Int. Cl.
  *B01D 39/16* (2006.01)
  *E02B 15/10* (2006.01)
  *E02B 15/08* (2006.01)
  *C02F 103/00* (2006.01)
  *C02F 103/08* (2006.01)

(52) U.S. Cl.
  CPC .......... *E02B 15/045* (2013.01); *E02B 15/046* (2013.01); *E02B 15/0814* (2013.01); *E02B 15/0842* (2013.01); *E02B 15/10* (2013.01); *B01D 2239/0258* (2013.01); *B01D 2239/0421* (2013.01); *C02F 2103/007* (2013.01); *C02F 2103/08* (2013.01); *C02F 2201/008* (2013.01); *Y02A 20/204* (2018.01)

(58) Field of Classification Search
  CPC ................ E02B 15/10; B01D 39/1692; B01D 2239/0258; B01D 2239/0421
  USPC ... 210/170.05, 170.09, 170.11, 242.3, 242.4, 210/776, 923, 924, DIG. 5
  See application file for complete search history.

(56) References Cited

U.S. PATENT DOCUMENTS

| | | | | |
|---|---|---|---|---|
| 4,588,501 A | * | 5/1986 | Jordan | E02B 15/048 210/242.3 |
| 5,409,607 A | * | 4/1995 | Karlberg | E02B 15/048 210/242.3 |
| 5,531,890 A | * | 7/1996 | Keenan | E02B 15/048 210/242.3 |
| 5,795,478 A | * | 8/1998 | Hirs | B01D 17/0208 210/DIG. 5 |
| 8,608,959 B2 | * | 12/2013 | Gastaldi | E02B 15/048 210/170.05 |
| 8,920,643 B2 | * | 12/2014 | Clauss | E02B 15/046 210/170.05 |
| 9,862,622 B2 | | 1/2018 | Hwang et al. | |
| 10,000,391 B2 | | 6/2018 | Moon et al. | |
| 2003/0141236 A1 | * | 7/2003 | Nilsen | E02B 15/0814 210/242.3 |
| 2011/0266213 A1 | * | 11/2011 | Jo | B01D 39/2079 210/496 |
| 2015/0191868 A1 | * | 7/2015 | Lee | D06M 13/513 428/391 |
| 2015/0203370 A1 | * | 7/2015 | Hwang | C02F 1/40 210/489 |
| 2015/0225290 A1 | * | 8/2015 | Lee | B01D 39/083 216/7 |
| 2015/0258588 A1 | * | 9/2015 | Moon | B08B 17/065 428/156 |
| 2018/0179718 A1 | * | 6/2018 | Lee | E02B 15/045 |

FOREIGN PATENT DOCUMENTS

| | | |
|---|---|---|
| JP | 1999-152081 A | 6/1999 |
| KR | 10-2002-0044877 A | 6/2002 |
| KR | 10-2011-0121743 A | 11/2011 |
| KR | 10-2014-0002971 A | 1/2014 |
| KR | 10-2014-0011843 A | 1/2014 |
| KR | 10-1431672 B1 | 8/2014 |
| KR | 10-1511949 B1 | 4/2015 |
| KR | 10-2015-0108287 A | 9/2015 |

\* cited by examiner

OIL COLLECTING APPARATUS AND OIL COLLECTING SYSTEM HAVING THE SAME

CROSS-REFERENCE TO RELATED APPLICATION

This application claims the benefit of Korean Patent Application No. 10-2016-0181523, filed on Dec. 28, 2016, in the Korean Intellectual Property Office, the disclosure of which is incorporated herein in its entirety by reference.

BACKGROUND

1. Field

One or more embodiments relate to an oil-collecting apparatus and an oil-collecting system including the same, and more particularly, to an oil-collecting apparatus for rapidly collecting oil or a hazardous and noxious substance (HNS) in water and an oil-collecting system including the same.

2. Description of the Related Art

When an oil-leaking accident occurs in the sea or on a river, oil or a hazardous and noxious substance (HNS) drifts and is rapidly dispersed on a surface of the sea or the river, thereby causing serious contamination to the environment. Thus, when a leaking-accident of the oil or the HNS, it is important to quickly remove the leaked oil or HNS.

When the oil leakage occurs, a method of spraying an emulsifying agent on the surface of water, on which the oil floats, and sinking the oil toward a bottom of the sea or a river, a method of eliminating the oil on the seashore by using an adsorption bag after contaminating materials are dispersed to the seashore, etc. are used, in general. However, the emulsifying agent has a problem of causing secondary contamination, since the emulsifying agent sinks the oil toward the bottom, and the oil elimination by using the adsorption bag may be implemented only after the contaminating materials are abundantly spread. Thus, technology is required, which may effectively block and withdraw oil dispersion right after the oil leakage.

Korean Patent Publication No. 2011-0121743 discloses technology for mounting a filtration membrane fence and a temporary storage, separating a floating material from water based on a difference in specific gravity, and then absorbing the separated floating material via a pump mounted in a ship. This technology takes much time to separate oil from the water, and thus, an operation speed is low and an additional pump has to be mounted in the ship as well as large driving power is needed to operate the pump.

Japanese Patent Publication No. 1999-152081 discloses technology for mounting, at a rear end of an oil fence pulled by a ship, a membrane including a rigid body plate and a rectifying plate, and when contaminated seawater passes through the rigid body plate and then the rectifying plate, separating oil from the contaminated seawater based on a difference in specific gravity between the oil and the water, collecting the oil via the membrane, and only discharging the water to the sea. In order to obtain the performance of the rectifying plate that separates the oil from the water based on the difference in specific gravity between the oil and the water, a length of the rectifying plate has to be elongated in a direction in which the ship proceeds, and a length of the membrane collecting and storing the oil has to be elongated in correspondence to the length of the rectifying plate. Accordingly, when a pressure of a fluid applied to the membrane storing the oil is strong, the oil fence may not be able to cope with the pressure and may be damaged. Also, it takes a lot of time to separate the oil and the water, and thus, an operation speed is low.

Japanese Patent Publication No. 1999-028459 discloses a floating material-collecting apparatus including a plurality of separating chambers arranged in top and bottom directions so as to separate water and a floating material based on specific gravity, wherein a heavy liquid is introduced to the separating chamber at a bottom position. According to the floating material-collecting apparatus, the seawater may pass through a wall portion a number of times, and thus, a process of filtering the floating material included in the seawater may be repetitively performed. However, the floating material-collecting apparatus and a ship have to be connected via a collecting pipe, and an additional pump and an additional separating device connected to the collecting pipe have to be mounted in the ship, and thus, a general structure of the system may be complex and complicated and large driving power may be needed.

Korean Patent Publication No. 2014-0011843 discloses technology for connecting separating vessels and bags to a rear end of an oil fence pulled by a ship; mounting a mesh in the first separating vessel and discharging only water from the seawater including tar and sewage; and separating, via the second separating vessel, the sewage and tar having passed through a hill top mounted at a rear end of the mesh, based on a difference in specific gravity, and discharging processed liquid through a cylindrical discharge hole. The mesh in the first separating vessel has pores through which the seawater passes, and the seawater passing through the mesh includes a large amount of oil. Thus, the oil and an HNS floating on the surface of the seawater may not be thoroughly processed and may be just discharged again to the sea. Also, it takes a lot of time to separate the water and the oil in the second separating vessel, and thus, an operation speed is low.

Korean Patent Registration No. 1431672 discloses technology of an oil-removing ship for directly introducing the contaminated seawater into a ship, separating oil from the seawater by using an adsorption bag belt, and storing the separated oil in a storage tank. According to this technology, a ship for a specific purpose in which an inclination plate for accommodating the seawater introduced to the ship and guiding a flow of the seawater, an adsorption bag belt, and a driving device for driving the adsorption bag belt are mounted, has to be additionally manufactured, and the task of transporting the oil stored in the storage tank to a place outside the ship for the specific purpose, occurs.

PRIOR ART DOCUMENT

Patent Documents (Patent document 1) Korean Patent Publication No. 2011-0121743 (published on Nov. 9, 2011)
(Patent document 2) Japanese Patent Publication No. 1999-152081 (published on Jun. 8, 1999)
(Patent document 3) Japanese Patent Publication No. 1999-028459 (published on Feb. 2, 1999)
(Patent document 4) Korean Patent Publication No. 2014-0011843 (published on Jan. 29, 2014)
(Patent document 5) Korean Registered Patent No. 1431672 (published on Aug. 12, 2014)

SUMMARY

One or more embodiments include an oil-collecting apparatus and an oil-collecting system capable of rapidly collecting oil or a hazardous and noxious substance (HNS) in water, without including an additional power device.

One or more embodiments include an oil-collecting apparatus and an oil-collecting system capable of collecting oil or an HNS in water and directly discharging highly purified water.

Additional aspects will be set forth in part in the description which follows and, in part, will be apparent from the description, or may be learned by practice of the presented embodiments.

According to one or more embodiments, an oil-collecting apparatus includes: a body including an inlet through which a liquid is introduced, a first outlet through which purified water generated from the liquid introduced through the inlet is discharged, and a second outlet through which materials collected from the liquid are discharged; and a filter arranged at the first outlet of the body and generating the purified water by collecting the materials included in the liquid by allowing the liquid introduced through the inlet to pass therethrough.

The filter may include a porous mesh surface-processed to be hydrophilic.

The filter may include pores having a size of dozens of micrometers.

A plurality of nano-protuberance structures including a polymer material and having a diameter of 1 to 100 nanometers may be provided at a surface of the mesh.

The mesh may include a core of about 10 to about 500 meshes, a porous layer arranged on a surface of the core, a plurality of nano-protuberance structures arranged on a surface of the porous layer and including a polymer material, wherein the plurality of nano-protuberance structures have a diameter of about 1 to about 100 nm, a length of about 1 to about 10,000 nm, and an aspect ratio of about 1 to about 50, and an inorganic particle arranged at an end of at least one of the plurality of nano-protuberance structures.

The porous layer may include a hydrophilic polymer, the core may include a metal, a plastic, or a combination thereof, and the inorganic particle may include at least one of Ti, Cu, Au, Ag, Cr, Pt, Fe, Al, Si, an alloy thereof, and an oxide thereof.

The oil-collecting apparatus may further include a bulkhead arranged in a space among the inlet, the first outlet, and the second outlet, in the body, so as to form a first compartment connected to the inlet and a second compartment connected to the first outlet and the second outlet, and including a path for connecting the first compartment to the second compartment.

The oil-collecting apparatus may further include a merging portion arranged at the path and merging the materials included in the liquid passing through the path.

The merging portion may include a plurality of pipes arranged in parallel to one another, and an end of each of the plurality of pipes may be connected to the first compartment, and the other end of each of the plurality of pipes may be connected to the second compartment.

The body may include a top surface and a bottom surface, an end of the bulkhead may be connected to the top surface, the other end of the bulkhead may extend toward the bottom surface, and the path may be formed at the other end of the bulkhead.

At least a portion of the first outlet may be connected to the bottom surface of the body, and the inlet and the second outlet may be formed at a location distanced apart from the bottom surface of the body toward the top surface.

According to one or more embodiments, an oil-collecting system includes: a fence including a floating member floating on a surface of a liquid and a collecting net connected to the floating member and collecting materials included in the liquid; an oil-collecting apparatus connected to the fence and including: a body including an inlet through which the materials collected by the fence along with the liquid are introduced, a first outlet through which purified water generated from the liquid introduced through the inlet is discharged, and a second outlet through which the materials collected from the liquid are discharged; and a filter arranged at the first outlet of the body and generating the purified water by collecting the materials included in the liquid by allowing the liquid introduced through the inlet to pass therethrough; and a storage connected to the second outlet of the oil-collecting apparatus and accommodating the materials discharged through the second outlet.

The collecting net may include a porous mesh, wherein the porous mesh is surface-processed to be hydrophilic and includes: a core having a mesh shape; a porous layer arranged on a surface of the core; a plurality of nano-protuberance structures arranged on a surface of the porous layer and including a polymer material, wherein the plurality of nano-protuberance structures have a diameter of about 1 to about 100 nm, a length of about 1 to about 10,000 nm, and an aspect ratio of about 1 to about 50; and an inorganic particle arranged at an end of at least one of the plurality of nano-protuberance structures.

The storage may include a porous layer surface-processed to be hydrophilic and including a polymer nano-protuberance structure having a diameter of about 1 to about 100 nm, a length of about 1 to about 10,000 nm, and an aspect ratio of about 1 to about 50.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The inventive concept now will be described more fully hereinafter with reference to the accompanying drawings, in which elements of the invention are shown. The inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. Meanwhile, the terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items. Expressions such as "at least one of," when preceding a list of elements, modify the entire list of elements and do not modify the individual elements of the list.

Figure 1:
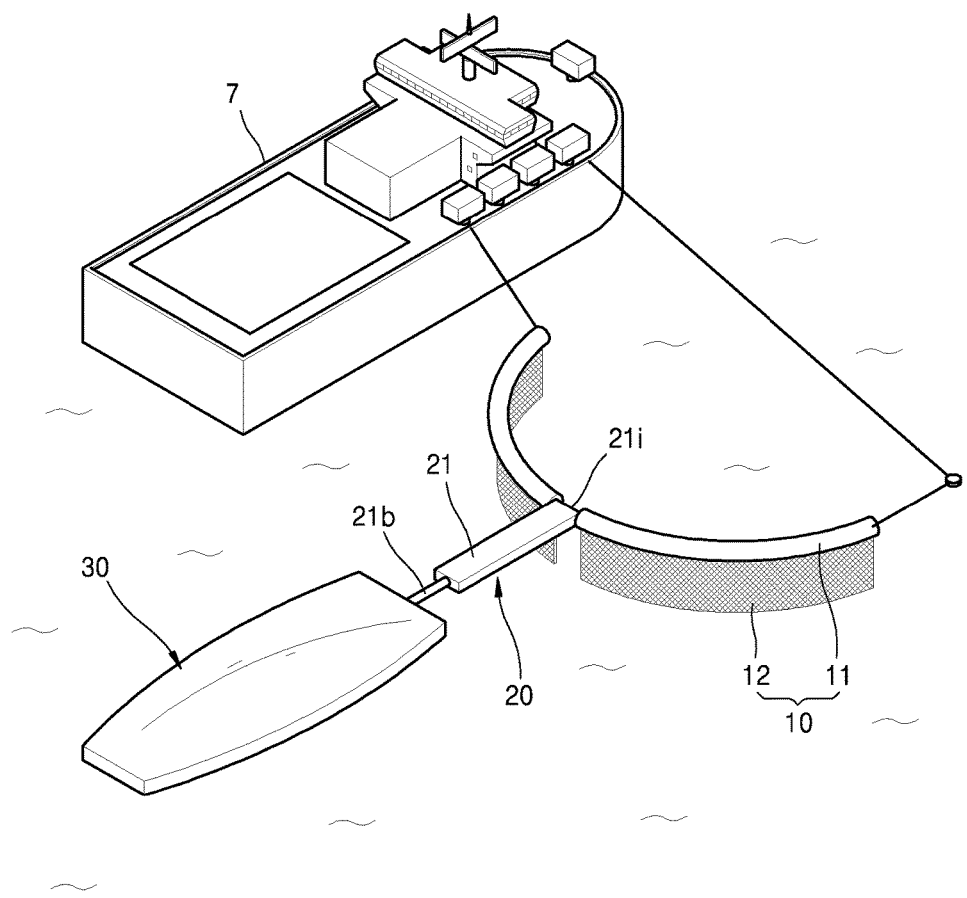
FIG. 1 is a schematic perspective view showing a state in which an oil-collecting system including an oil-collecting apparatus according to an embodiment is used.
Figure 2:
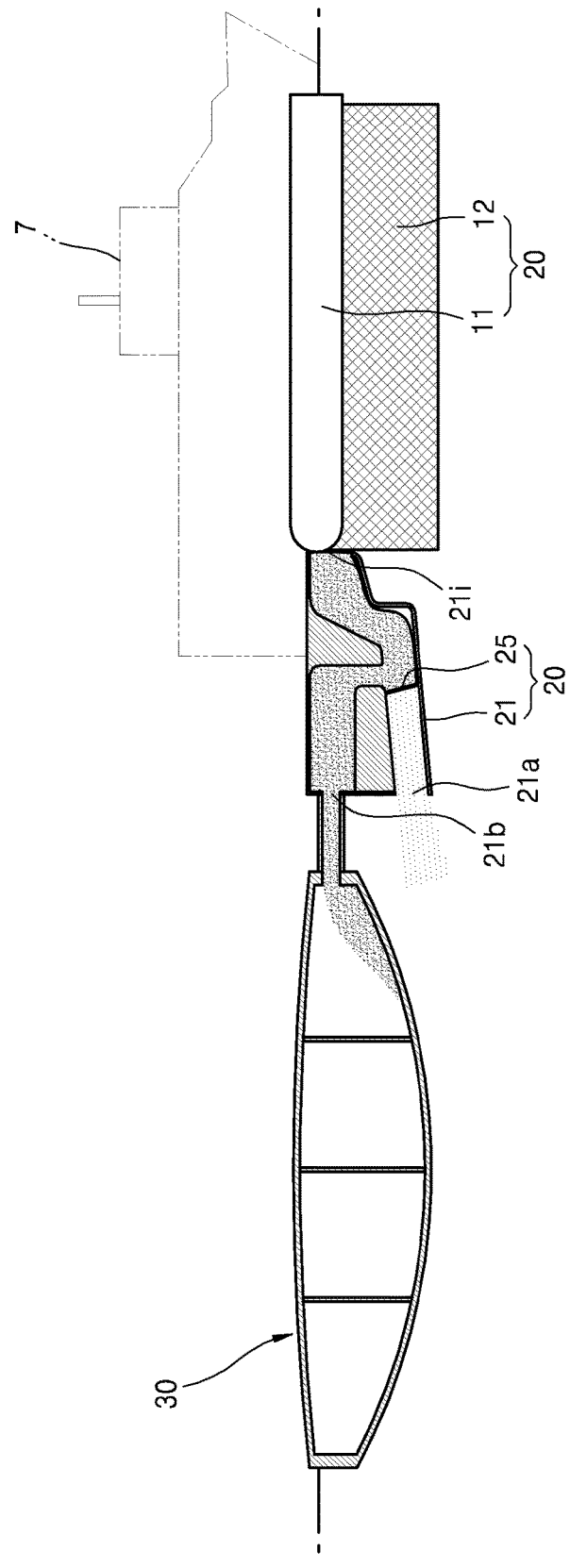
FIG. 2 is a cross-sectional view of the oil-collecting system illustrated in FIG. 1.
Figure 3:
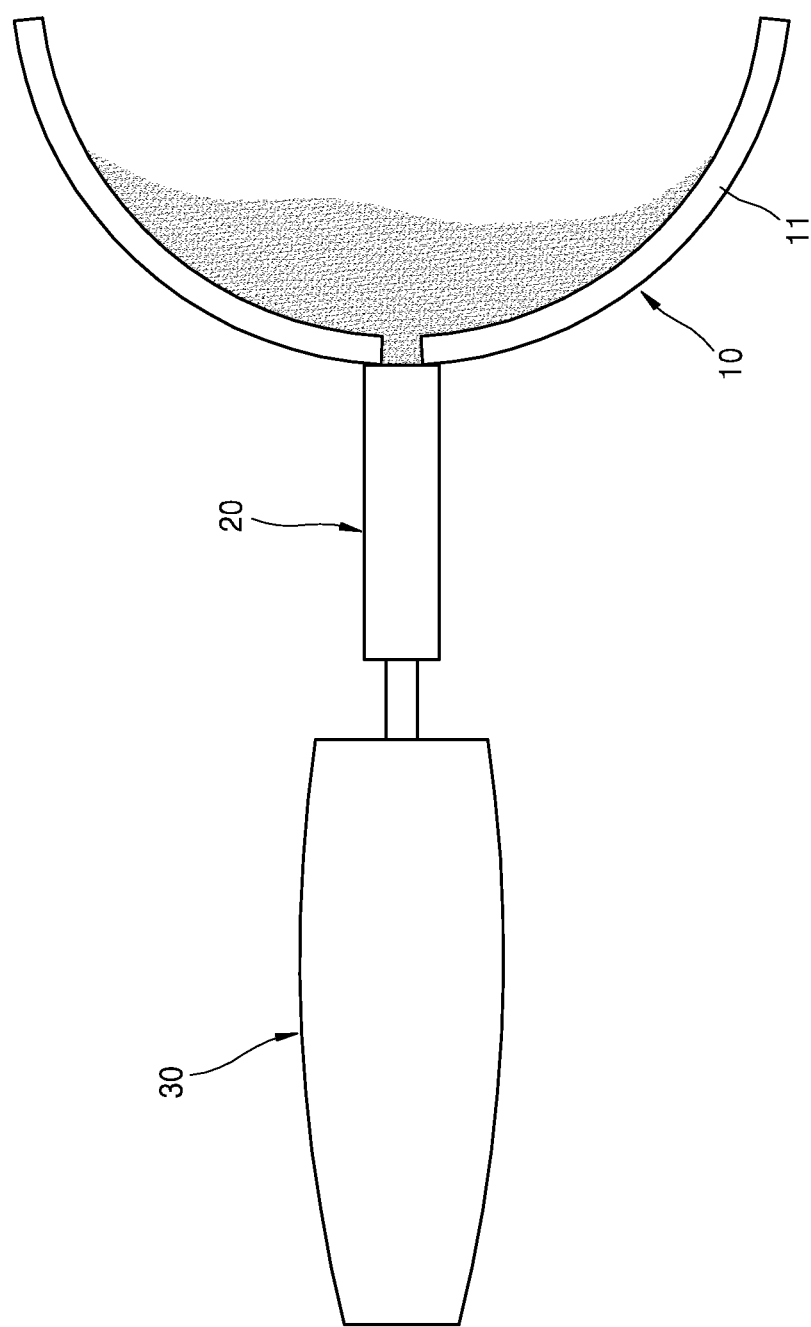
FIG. 3 is a top view of the oil-collecting apparatus included in the oil-collecting system illustrated in FIG. 1.
Figure 4A:
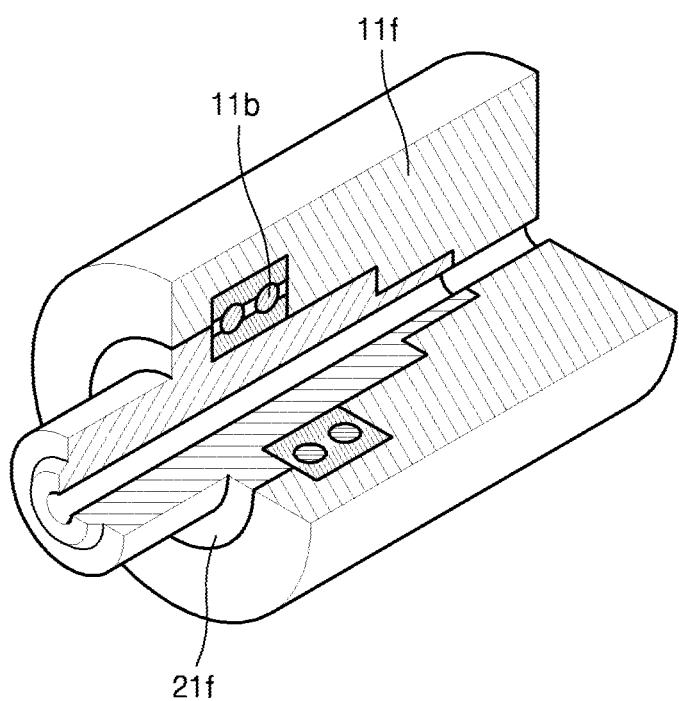
FIG. 4A is a schematic perspective view showing a section of a portion of a connecting device for connecting a fence and the oil-collecting apparatus in the oil-collecting system illustrated in FIG. 1.

FIG. 1 is a schematic perspective view showing a state in which an oil-collecting system including an oil-collecting apparatus 20 according to an embodiment is used. FIG. 2 is a cross-sectional view of the oil-collecting system illustrated in FIG. 1. FIG. 3 is a top view of the oil-collecting apparatus 20 included in the oil-collecting system illustrated in FIG. 1. FIG. 4A is a schematic perspective view showing a section of a portion of a connecting device for connecting a fence 10 to the oil-collecting apparatus 20 in the oil-collecting system illustrated in FIG. 1.

The oil-collecting system according to the embodiment illustrated in FIGS. 1 through 4 may include the fence 10 including a floating member 11 and a collecting net 12, the oil-collecting apparatus 20 connected to the fence 10, purifying a liquid, and collecting materials included in the liquid, and a storage 30 connected to a rear end of the oil-collecting apparatus 20 and accommodating the collected materials.

The floating member 11 of the fence 10 is connected to a ship 7, and thus, when the ship 7 advances, while the fence 10 is connected to the ship 7, the ship 7 may pull the fence 10 so that the collecting net 12 of the fence 10 may collect materials floating on the surface of water.

Figure 4B:
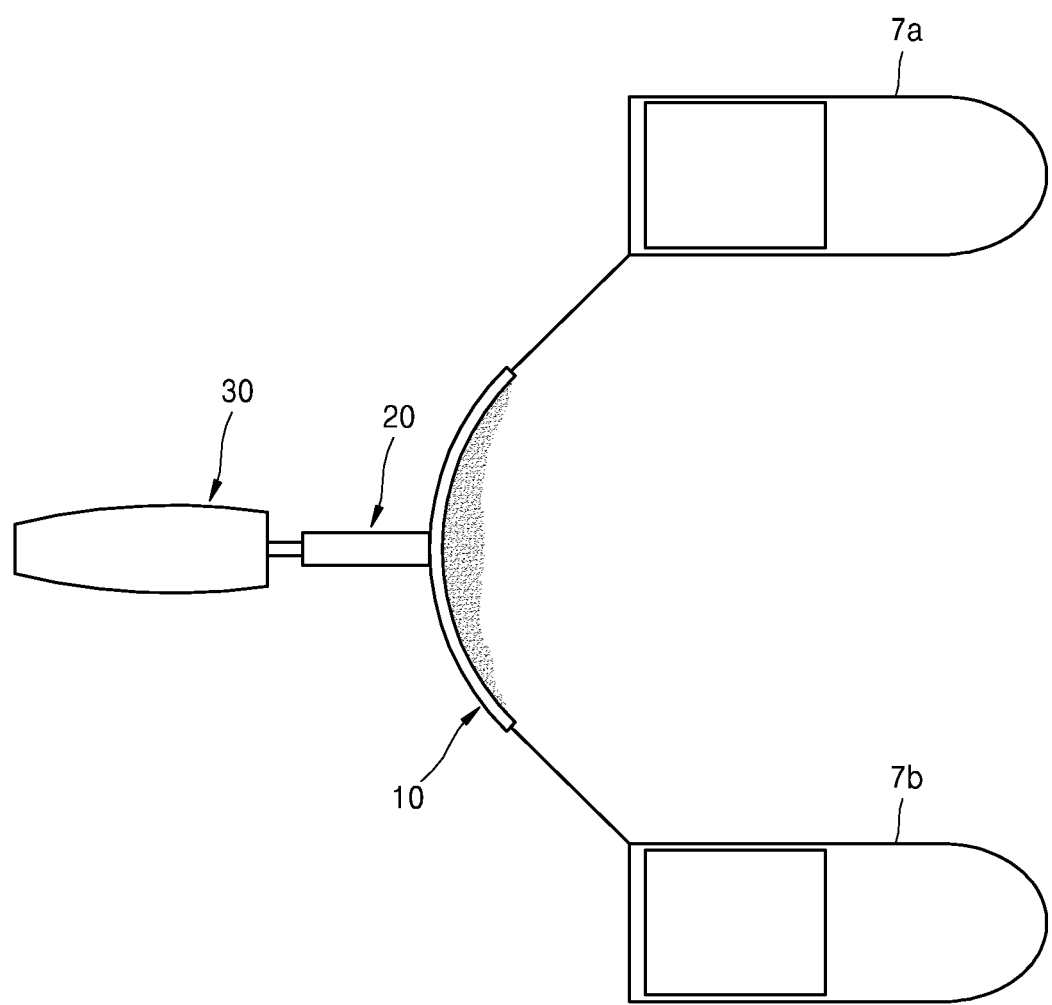
FIG. 4B is a schematic top view showing another state in which the oil-collecting system illustrated in FIGS. 1 through 3 is used.

FIG. 4B is a schematic top view showing another state in which the oil-collecting system illustrated in FIGS. 1 through 3 is used.

In the state illustrated in FIG. 4B, two ships 7a and 7b may pull the fence 10, the oil-collecting apparatus 20, and the storage 30 and collect materials floating on the surface of water.

Figure 4C:
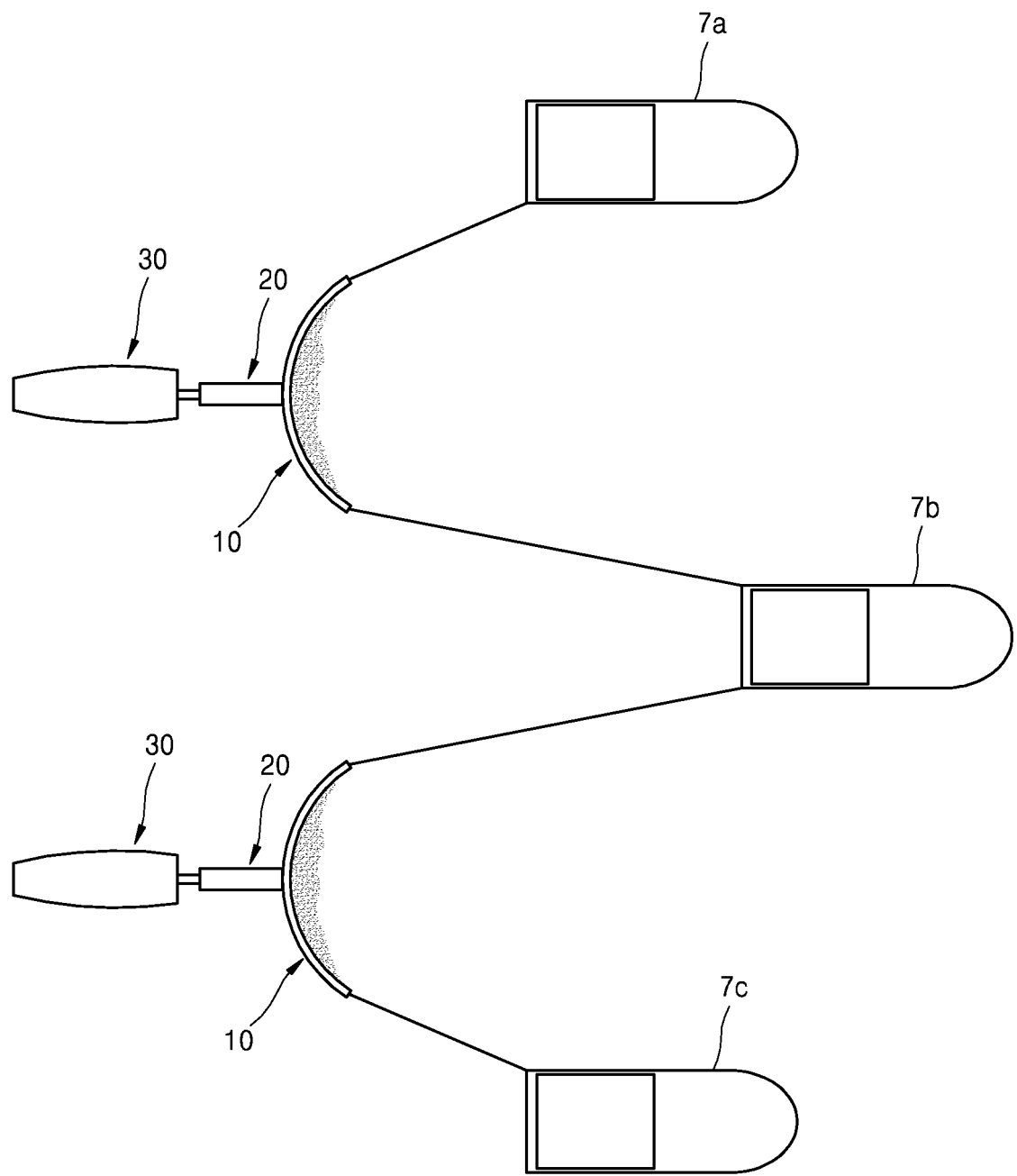
FIG. 4C is a schematic top view of showing another state in which the oil-collecting system illustrated in FIGS. 1 through 3 is used.

FIG. 4C is a schematic top view showing another state in which the oil-collecting system illustrated in FIGS. 1 through 3 is used.

In the state illustrated in FIG. 4C, the fence 10 may be connected between the two ships 7a and 7b, and the fence 10 may be connected between the ship 7b and a ship 7c, and the oil-collecting apparatus 20 and the storage 30 to the fence 10 may collect materials floating on the surface of water.

Figure 5:
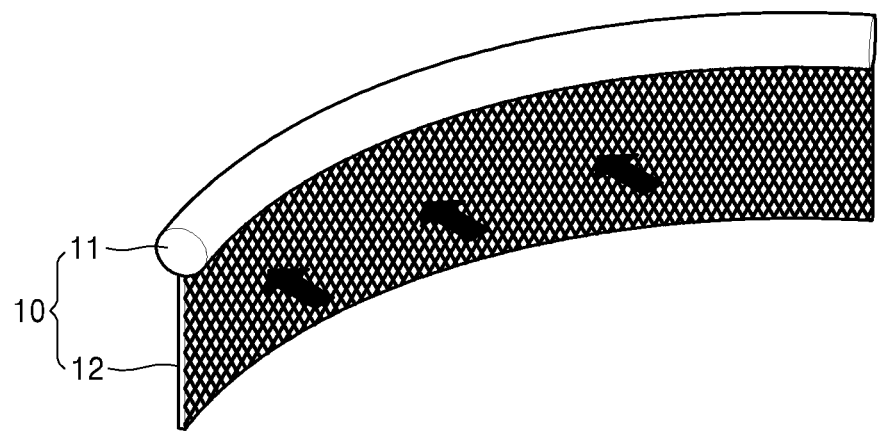
FIG. 5 is a perspective view showing an operational state of a fence in the oil-collecting system illustrated in FIG. 1.
Figure 6:
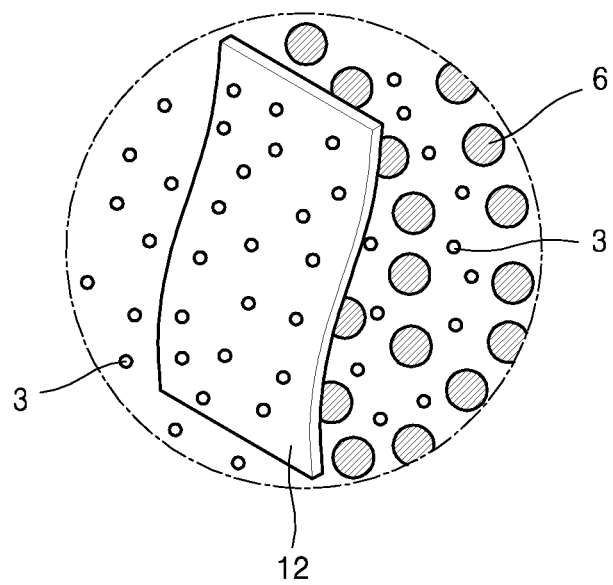
FIG. 6 is a view for describing an operational state in which the fence illustrated in FIG. 5 collects a floating material.

FIG. 5 is a perspective view showing an operational state of the fence 10 in the oil-collecting system illustrated in FIG. 1. FIG. 6 is a view for describing an operational state in which the fence 10 illustrated in FIG. 5 collects floating materials.

The fence 10 may include the floating member 11 having buoyancy so as to float on a surface of a liquid, such as sewage or a river, and the collecting net 12 connected to the floating member 11 and collecting materials (floating materials) included in the liquid. The floating member 11 may include a material, such as polystyrene, so as to have sufficient buoyancy, or may be formed as a tube charged with air.

The collecting net 12 connected to the floating member 11 may collect a material 6, such as oil or a hazardous and noxious substance (HNS), included in a liquid 3. The collecting net 12 may include a hydrophilic porous material and may be formed as a mesh. Also, a plurality of nano-protuberance structures 12n (refer to FIG. 10) may be provided on a surface of the collecting net 12 so that the collecting net 12 may quickly collect the oil or the HNS.

Referring to FIG. 6, while the ship 7 pulls the fence 10, the liquid 3 including the material 6 may pass through the collecting net 12 of the fence 10, and only the material 6 included in the liquid 3 may be collected by the collecting net 12 and the purified liquid 3 may pass through the collecting net 12. Since the collecting net 12 may be hydrophilic, while having a property for collecting the material 6, such as oil, the liquid 3 may easily pass through the collecting net 12, when the ship 7 pulls the fence 10, and thus, water pressure applied to a surface of the fence 10 via the liquid 3 may be minimized.

Figure 7:
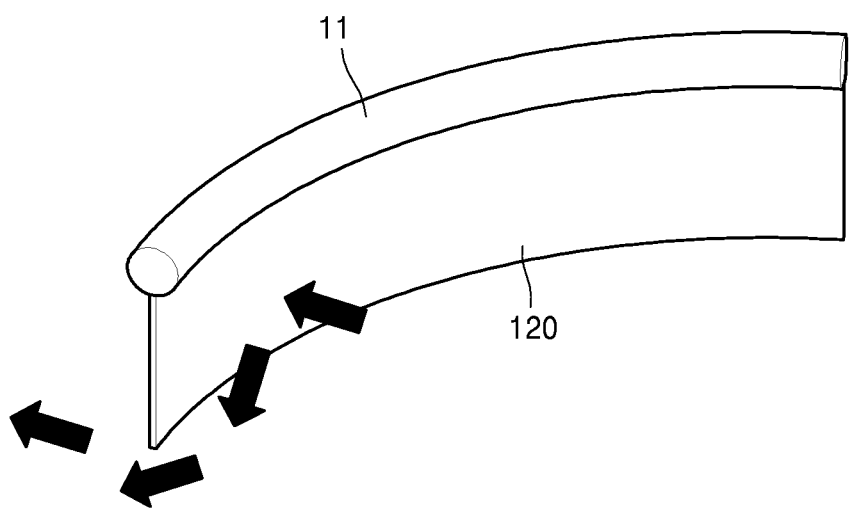
FIG. 7 is a perspective view showing an operational state of a fence according to a comparative embodiment for comparison with the fence illustrated in FIG. 5 in terms of performance.

FIG. 7 is a perspective view showing an operational state of a fence according to a comparative embodiment for comparison with the fence illustrated in FIG. 5 in terms of performance.

The fence according to the comparative embodiment illustrated in FIG. 7 may include an enveloping membrane 120 confining the floating member 11 and a liquid. The enveloping membrane 120 may confine the liquid and materials included in the liquid by not allowing the liquid and the materials to pass therethrough. Thus, the materials, such as oil, may be prevented from being dispersed away. However, the fence having this structure may only be used to temporarily envelope oil and prevent the dispersion of oil, and may not be used to quickly and continually collect and withdraw oil.

In addition, since the liquid does pass through the enveloping membrane 120, water pressure due to the liquid is applied to a surface of the enveloping membrane 120. Thus, when a ship pulls the fence or when the waves are strong, a contaminated liquid including materials may bump into the enveloping membrane 120 and then be carried away through a bottom of the enveloping membrane 120 as illustrated in FIG. 7, or the enveloping membrane 120 may be overturned due to strong pressure of the waves.

The oil-collecting apparatus 20 may be connected to a rear end of the fence 10. The oil-collecting apparatus 20 may accommodate the liquid and the materials collected by the fence 10, and then, may filter and collect the materials included in the liquid and discharge only purified liquid.

Referring to FIGS. 1 and 2, an inlet 21*i* of the oil-collecting apparatus 20 may be connected to the fence 10, and thus, the materials collected by the fence 10 and the liquid may be introduced to a body 21 of the oil-collecting apparatus 20 via the inlet 21*i*. A filter 25 may be provided in the body 21 of the oil-collecting apparatus 20, and water that is purified by the filter 25 may be discharged to the outside of the body 21 via a first outlet 21*a*.

The storage 30 may be connected to a rear end of the oil-collecting apparatus 20. The storage 30 may be connected to a second outlet 21*b* of the oil-collecting apparatus 20 and may accommodate the materials collected by the oil-collecting apparatus 20.

The inlet 21*i* of the oil-collecting apparatus 20 may be detachably connected to the fence 10 via the connecting device illustrated in FIG. 4A. The inlet 21*i* of the oil-collecting apparatus 20 may include a connection plug 21*f* illustrated in FIG. 4A, and the connection plug 21*f* may be coupled to a connector 11*f* mounted in the fence 10. A holding bearing 11*b* may be arranged between the connection plug 21*f* and the connector 11*f*, and the holding bearing 11*b* may maintain a connection state between the connection plug 21*f* and the connector 11*f*.

Via the connecting device including the connection plug 21*f* and the connector 11*f* described above, the inlet 21*i* of the oil-collecting apparatus 20 may be simply coupled to the fence 10 via a one-touch coupling arrangement, and the inlet 21*i* of the oil-collecting apparatus 20 may be detached from the fence 10.

Figure 8:
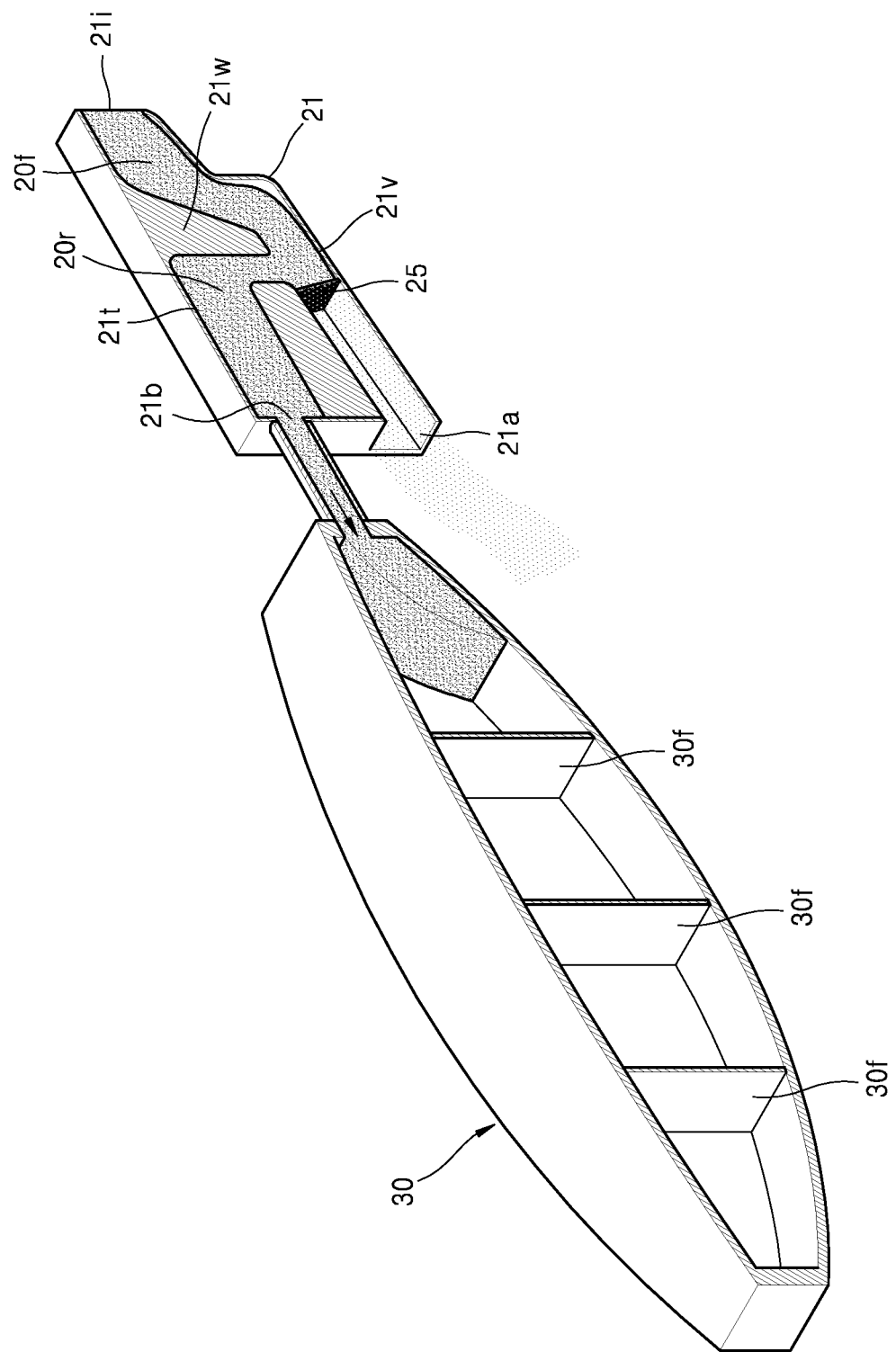
FIG. 8 is a perspective view showing an operational state of some components of the oil-collecting system illustrated in FIG. 1.

FIG. 8 is a perspective view showing an operational state of some components of the oil-collecting system illustrated in FIG. 1.

The oil-collecting apparatus 20 may include the body 21 including a top surface 21*t* and a bottom surface 21*v* and which is empty inside, and the filter 25 mounted in the body 21.

The body 21 may include the inlet 21*i* connected to the fence 10 and through which a liquid and materials collected by the fence 10 are introduced, the first outlet 21*a* through which purified water generated from the liquid introduced through the first inlet 21*i* is discharged, and the second outlet 21*b* through which the materials collected from the liquid are discharged. The body 21 may include a plastic or a metal.

At least a portion of the first outlet 21*a* may be connected to the bottom surface 21*v* of the body 21. The inlet 21*i* and the second outlet 21*b* may be formed in a location distanced apart from the bottom surface 21*v* of the body 21 toward the top surface 21*t*.

An inner wall of the body 21 extending from the first outlet 21*a* to the bottom surface 21*v* may include an inclined plane inclined with respect to the bottom surface 21*v*. Also, a surface of a bulkhead 21*w*, which is toward the inlet 21*i*, may include an inclined plane inclined with respect to the bottom surface 21*v*.

Due to a structure of the inclined plane of the inner wall of the body 21, the inclined plane being connected to the inclined plane of the bulkhead 21*w* and the inlet 21*i*, the liquid introduced through the inlet 21*i* may flow along the inclined plane of the inner wall of the body 21 and then may change a flow direction toward the bottom surface 21*v* of the body 21 due to the inclined plane of the bulkhead 21*w*. The liquid flowing toward the bottom surface 21*v* may pass through a path between the bulkhead 21*w* and the bottom surface 21*v* and flow to the filter 25.

The filter 25 may be arranged at the first outlet 21*a* of the body 21 and may allow the liquid introduced through the inlet 21*i* to pass therethrough and collect materials included in the liquid to generate purified water.

The filter 25 may include a porous mesh surface-processed to be hydrophilic. The mesh of the filter 25 may include pores having a size of dozens of micrometers, so as to be hydrophilic. Also, a plurality of nano-protuberance structures including a polymer material may be provided at a surface of the mesh.

The filter 25 having this structure may allow the liquid introduced through the inlet 21*i* to pass therethrough, while filtering and collecting materials, such as oil or an HNS, included in the liquid. In particular, a concentration of oil included in the liquid having passed through the filter 25 meets a criterion required for an oil-water separator, that is, a value equal to or less than 15 ppm, and thus, the liquid having passed through the filter 25 may be discharged to the sea through the first outlet 21*a*.

The bulkhead 21*w* dividing a first compartment 20*f* and a second compartment 20*r* may be mounted in the body 21 of the oil-collecting apparatus 20. The first compartment 20*f* may be connected to the inlet 21*i* and the second compartment 20*r* may be connected to the second outlet 21*b*. The bulkhead 21*w* may be arranged in a space among the inlet 21*i*, the first outlet 21*a*, and the second outlet 21*b*, in the body 21.

An end of the bulkhead 21*w* may be connected to the upper surface 21*t* of the body 21, and the other end of the bulkhead 21*w* may extend toward the bottom surface 21*v* of the body 21. Since the other end of the bulkhead 21*w* may be apart from the bottom surface 21*v* of the body 21, a path for connecting the first compartment 20*f* and the second compartment 20*r* may be provided between the other end of the bulkhead 21*w* and the bottom surface 21*v* of the body 21.

The storage 30 connected to the second outlet 21*b* of the oil-collecting apparatus 20 may store materials discharged from the second outlet 21*b*. The storage 30 may be formed to have an empty space therein by using a plastic or a metal.

The storage 30 may include a porous layer 30*f*. The materials included in the liquid may be discharged to the outside of the oil-collecting apparatus 20 via the filter 25 of the oil-collecting apparatus 20. However, when the materials collected by the oil-collecting apparatus 20 are transported to the storage 30, some of the liquid may also be transported to the storage 30.

The porous layer 30*f* of the storage 30 may include materials including pores having a size of dozens of micrometers, and a surface of the porous layer 30*f* may include a nano-protuberance structure including a polymer material and may be surface-processed so as to have hydrophilicity. Thus, the porous layer 30*f* of the storage 30 may separate the liquid and the materials in the storage 30.

As the oil-collecting apparatus 20 and the fence 10 are connected to each other via the connecting device, the storage 30 and the oil-collecting apparatus 20 may be connected to be separable from each other via a connecting device operating in a one-touch method. Thus, when the storage 30 is filled with materials, the storage 30 may be separated from the oil-collecting apparatus 20 and a new storage 30 which is empty inside may be connected to the oil-collecting apparatus 20, for a continual oil-collecting operation.

The oil-collecting apparatus 20 described above may quickly collect and withdraw the materials collected by the fence 10, even when a ship sails and pulls the fence 10 at a high speed. Also, the oil-collecting apparatus 20 may collect the materials via an operation of the filter 25 without depending on a power supply from the outside, and thus, it is not necessary to mount an additional power device in the ship or the oil-collecting system in order to operate the oil-collecting apparatus 20 and the oil-collecting system.

Figure 9A:
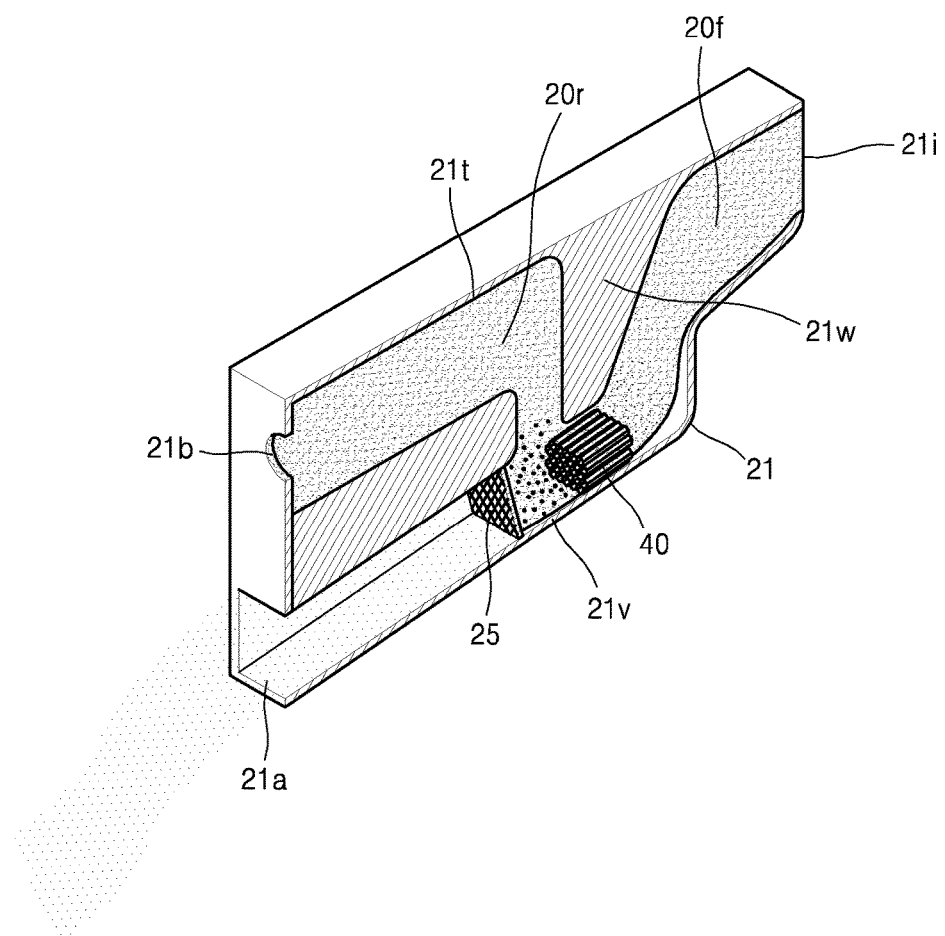
FIG. 9A is a perspective view of an oil-collecting apparatus according to another embodiment.

FIG. 9A is a perspective of an oil-collecting apparatus according to another embodiment.

The oil-collecting apparatus illustrated in FIG. 9A has substantially the same structure as the oil-collecting apparatus according to the embodiment illustrated in FIG. 8. Thus, components of the oil-collecting apparatus of FIG. 9A that are the same as the components of the oil-collecting apparatus of FIG. 8 are referred to by using the same reference numerals as those of FIG. 8.

The oil-collecting apparatus may further include a merging portion 40 arranged at a path between the bulkhead 21w and the bottom surface 21v of the body 21 in the body 21. The merging portion 40 may include a plurality of pipes arranged to overlap one another horizontally. An end of each of the plurality of pipes may be connected to the first compartment 20f connected to the inlet 21i, and the other end of each of the plurality of pipes may be connected to the second compartment 20r connected to the first outlet 21a and the second outlet 21b. The merging portion 40 may allow the liquid and the materials of the first compartment 20f to pass therethrough, and merge the materials into a greater volume.

Since the merging portion 40 merges the materials included in the liquid into a greater volume, the materials having passed through the merging portion 40 may be more effectively collected by the filter 25 arranged at a downstream of the merging portion 40, when the materials pass through the filter 25.

Figure 9B:
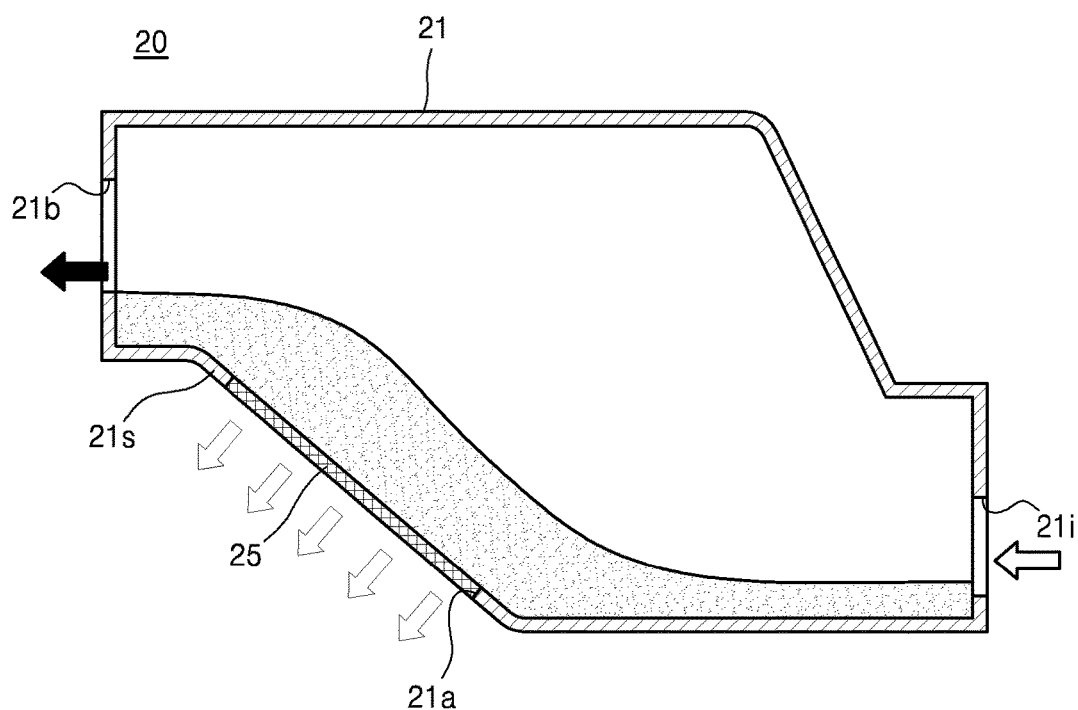
FIG. 9B is a cross-sectional view of an oil-collecting apparatus according to another embodiment.

FIG. 9B is a cross-sectional view of an oil-collecting apparatus according to another embodiment.

The oil-collecting apparatus according to the embodiment illustrated in FIG. 9B may include the body 21 which is empty inside, and the filter 25 mounted in the body 21.

The body 21 may include the inlet 21i through which a liquid and materials collected from the liquid are introduced, the first outlet 21a through which purified water generated from the liquid introduced through the first inlet 21i is discharged, and the second outlet 21b through which the materials collected from the liquid are discharged. The body 21 may include, at a bottom portion thereof, a resistance surface 21s gradually ascending from the inlet 21i toward the second outlet 21b.

The first outlet 21a may be formed at the resistance surface 21s, and the filter 25 may be arranged at the first outlet 21a at the resistance surface 21s of the body 21. Thus, while the liquid introduced through the inlet 21i flows toward the second outlet 21b, the liquid may obtain a resistance force opposing a flow direction of the liquid due to the resistance surface 21s. When the liquid flows along the resistance surface 21s and passes through a location of the filter 25, the materials included in the liquid may be collected by the filter 25. Thus, the purified water may be discharged to the outside of the body 21 via the first outlet 21a.

Figure 9C:
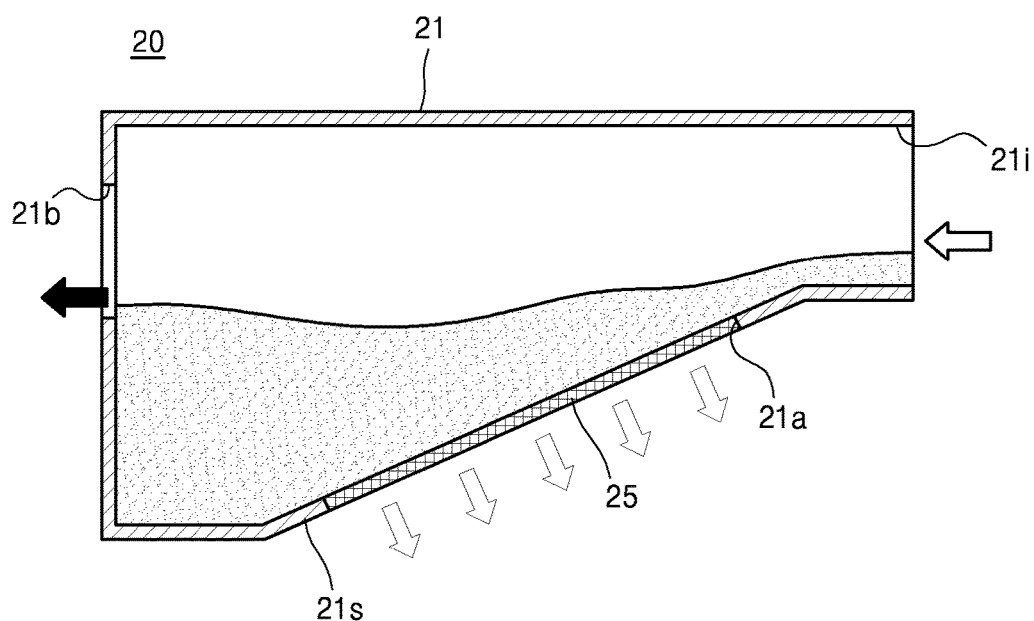
FIG. 9C is a cross-sectional view of an oil-collecting apparatus according to another embodiment.

FIG. 9C is a cross-sectional view of an oil-collecting apparatus according to another embodiment.

The oil-collecting apparatus according to the embodiment illustrated in FIG. 9C may include the body 21 which is empty inside, and the filter 25 mounted in the body 21.

The body 21 may include the inlet 21i through which a liquid and materials collected from the liquid are introduced, the first outlet 21a through which purified water generated from the liquid introduced through the first inlet 21i is discharged, and the second outlet 21b through which the materials collected from the liquid are discharged. The body 21 may include, at a bottom portion thereof, the resistance surface 21s gradually descending from the inlet 21i toward the second outlet 21b.

The first outlet 21a may be formed at the resistance surface 21s, and the filter 25 may be arranged at the first outlet 21a at the resistance surface 21s of the body 21. When the liquid flows along the resistance surface 21s and passes through the location of the filter 25, the materials included in the liquid may be collected by the filter 25. Thus, purified water may be discharged to the outside of the body 21 via the first outlet 21a.

Figure 10:
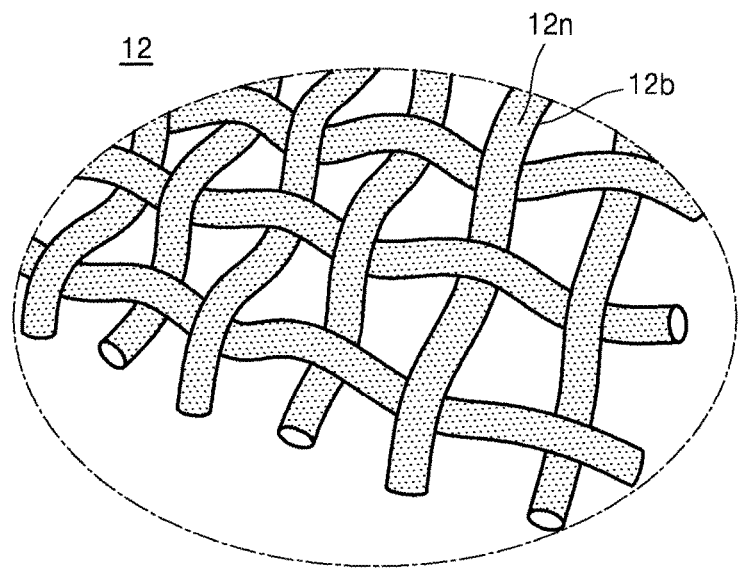
FIG. 10 is a perspective view of a structure of a portion of a fence of the oil-collecting system illustrated in FIG. 1.

FIG. 10 is a perspective view of a structure of a portion of the fence 10 of the oil-collecting system of FIG. 1.

The collecting net 12 illustrated in FIG. 10 may be manufactured as a porous mesh 12b including pores having a size of dozens of micrometers. The mesh 12b may include the plurality of nano-protuberance structures 12n including a polymer material and may be surface-processed to be hydrophilic.

The collecting net 12 may be formed as the mesh 12b having mesh holes through which water may pass. Embodiments are not limited to shapes of the mesh holes of the mesh 12b or methods of manufacturing the mesh 12b.

The collecting net 12 may be formed, for example, as 10 to 500 meshes. When such numbers of meshes are included as the collecting net 12, water may pass through the collecting net 12 and only oil may be filtered. When the collecting net 12 includes more than 500 meshes, sizes of the meshes may become too small so that a speed at which the water passes through the collecting net 12 may significantly decrease, which may degrade the de-oiling efficiency, and when the collecting net 12 includes less than 10 meshes, sizes of the meshes may become too large so that there is a possibility that the oil may also pass through the collecting net 12.

Figure 11:
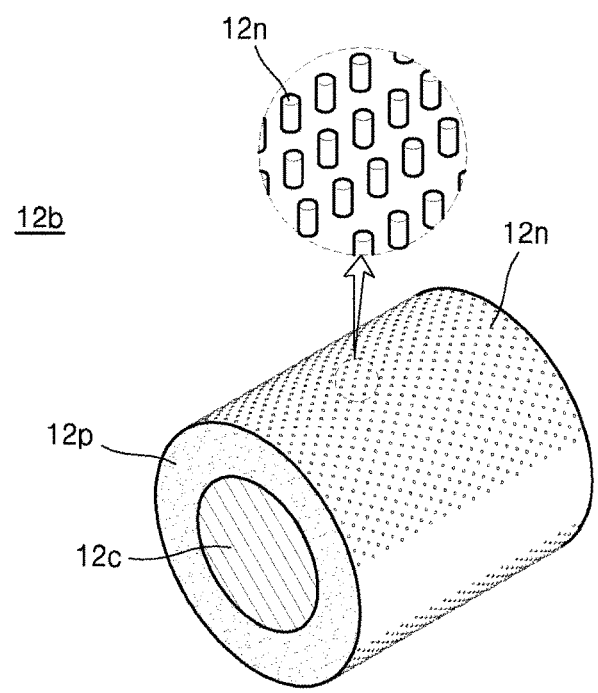
FIG. 11 is a perspective view of a section of an example of the fence illustrated in FIG. 10.

FIG. 11 is a perspective view of a section of an example of the fence 10 of FIG. 10.

The mesh 12b may include a core 12c having a mesh shape and including a metal or a hard plastic, a porous layer 12p arranged on a surface of the core 12c, and the plurality of nano-protuberance structures 12n arranged on a surface of the porous layer 12p. The porous layer 12p may include pores having a size of dozens of micrometers so as to be hydrophilic. The nano-protuberance structures 12n may have a diameter of 1 to 100 nanometers.

The core 12c may include a metal, a plastic, or a combination thereof, so as to have a predetermined rigidity.

The metal included in the core 12c may include Fe, Al, stainless steel, Cu, Pt, Au, Ag, Ti, Si, or an alloy thereof, or a combination thereof.

The plastic included in the core 12c is not particularly limited. For example, the plastic included in the core 12c may include at least one of polypropylene, polyethylene terephthalate, polyvinylidene fluoride, polytetrafluoroethylene, a copolymer thereof, and a combination thereof.

The porous layer 12p coated on the surface of the core 12c may be formed by forming the core 12c in a mesh shape and coating the surface of the core 12c with a polymer coating layer by dipping the core 12c having the mesh shape in a polymer coating solution.

The porous layer 12p may include a polymer which is highly rigid and hydrophilic. The polymer may include, for example, at least one of poly(N-isopropylacrylamide) (PNIPAm), poly(2-hydroxyethyl methacrylate (PHEMA), polysilsesquinoxane (PSQ), polyurethane (PU), poly (ethylene glycol) (PEG), polyetherimide (PEI), poly (methylmethacrylate) (PMMA), and polyvinylalcohol (PVA).

The porous layer 12p may be coated on the core 12c such that the mesh hole of the core 12c is not filled. When the mesh hole is blocked, there may be an insufficient space, through which water may pass, so that water pressure applied to the collecting net 12 may increase and the de-oiling function may be deteriorated.

As shown in Table 1, the hydrophilic polymers described above have high surface energy and low contact angles, so that the porous layer 12p having a maximized hydrophilic property may be formed.

TABLE 1

| Polymer | Surface Energy (mJ/m$^2$) | Contact Angle (°) |
| --- | --- | --- |
| PNIPAm | 38.9 | 75 |
| PHEMA | 57.6 | 59 |
| PU | 37.5 | 77.5 |
| PEG | 41.3 | 45 |
| PEI | 59.5 | 68 |
| PMMA | 41.1 | 68-72 |
| PVA | 38.5 | 60.6 |

Figure 12:
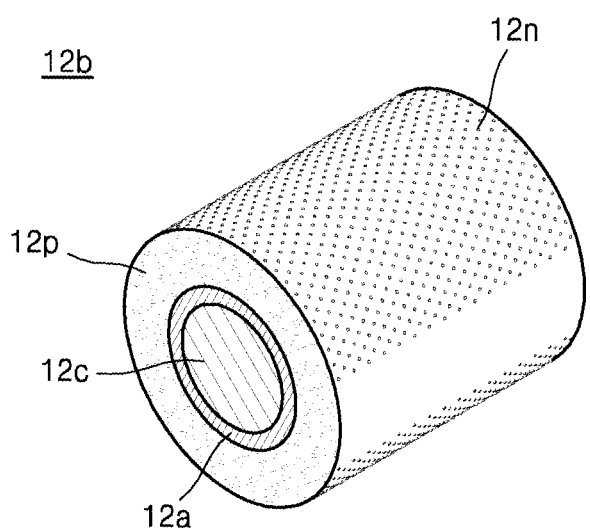
FIG. 12 is a perspective view of a section of another example of the fence illustrated in FIG. 10.

FIG. 12 is a perspective view of a section of another example of the fence 10 of FIG. 10.

The mesh 12b may include the core 12c including, for example, a metal or a hard plastic, the porous layer 12p arranged on the surface of the core 12c with an adhesion layer 12a between the porous layer 12p and the surface of the core 12c, and the plurality of nano-protuberance structures 12n arranged on the surface of the porous layer 12p. The porous layer 12p may be formed to have pores having sizes of dozens of micrometers so as to be hydrophilic. The collecting net 12 including the mesh 12b having the structures illustrated in FIGS. 11 and 12 may have high wettability with respect to water and thus, the water may easily pass through the collecting net 12. That is, when a liquid in which oil and water are mixed tries to pass through the collecting net 12, the water may easily pass through the collecting net 12, while the oil may not pass through the collecting net 12 due to a repulsive force with respect to the water and may be filtered and collected by the collecting net 12.

Figure 13:
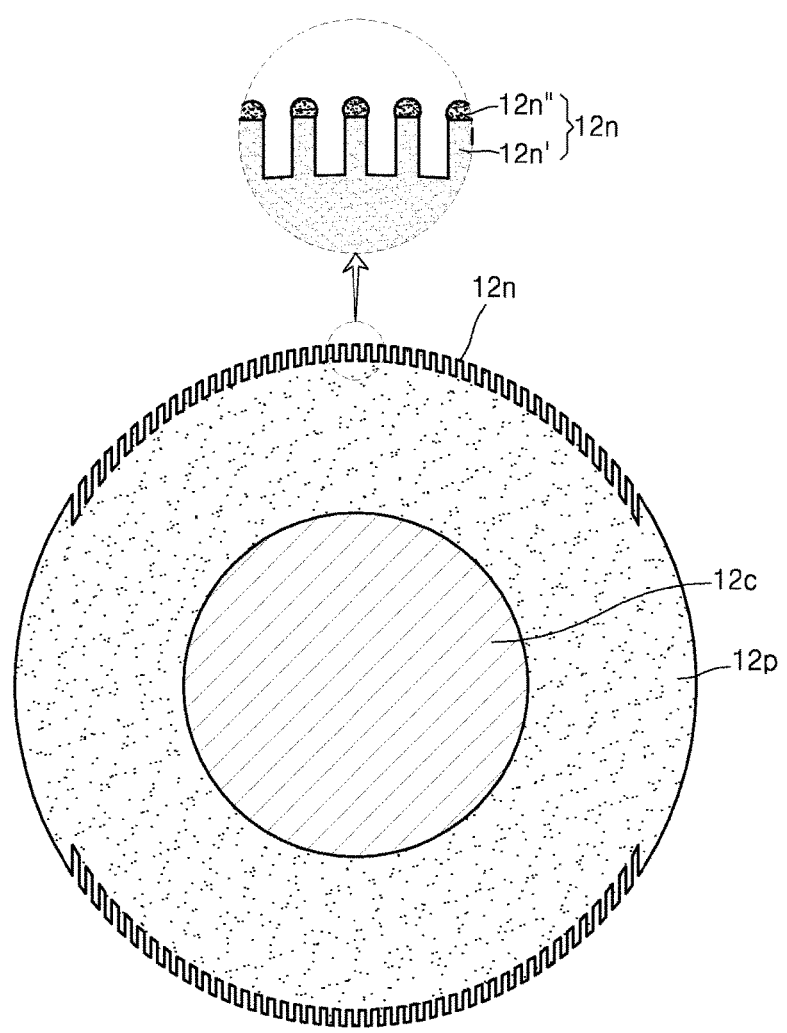
FIG. 13 is an enlarged view of a nano-protuberance structure on a surface of the fence illustrated in FIG. 11.

FIG. 13 is an enlarged view of the plurality of nano-protuberance structures 12n on the surface of the fence 10 of FIG. 11.

As illustrated in FIG. 13, the nano-protuberance structures 12n may include a plurality of protrusion units 12n' arranged at the same interval between each other and having a nano-size, and inorganic particles 12n" arranged at ends of the protrusion units 12n'.

The nano-protuberance structures 12n may be formed by performing, in a perpendicular direction, plasma-processing on the core 12c coated with the porous layer 12p, and thus, the nano-protuberance structures 12n may be formed on an upper surface and/or a lower surface of the porous layer 12p. Also, the protrusion units 12n' may be arranged in a direction perpendicular to a direction horizontally crossing a center of the core 12c in FIG. 13, regardless of a curvature of the surface of the porous layer 12p.

Each of the protrusion units 12n' may have a diameter of 1 to 100 nm, a length of 1 to 10,000 nm, and an aspect ratio of 1 to 50. The protrusion units 12n' may be included in the nano-protuberance structures 12n on the surface of the porous layer 12p, by having a form, such as nano-hairs, nano-fibers, nano-pillars, nano-rods, or nano-wires.

The inorganic particles 12n" may be arranged on at least portions of the ends of the protrusion units 12n'. Each of the inorganic particles 12n" may include a plurality of inorganic particles forming a cluster. In addition, although the inorganic particles 12n" may be arranged at the ends of almost all or all the protrusion units 12n', some of the inorganic particles 12n" may be etched away in an etching process via the plasma-process, and thus, not all of the ends of the protrusion units 12n' may have the inorganic particles 12n".

The inorganic particles 12n" may include a metal or a metal oxide capable of generating a surface property which is appropriate for de-oiling.

The inorganic particles 12n" may include a metal or a metal oxide generating a hydrophilic or ultra-hydrophilic property for allowing water to pass through the collecting net 12 and not allowing oil to pass through the collecting net 12. The metal or the metal oxide may be derived from a metal mesh structure. For example, the inorganic particles 12n" may include at least one of Ti, Cu, Au, Ag, Cr, Pt, Fe, Al, Si, an alloy thereof, and an oxide thereof.

For example, when the inorganic particles 12n" including $TiO_2$ are arranged at the ends of the protrusion units 12n' included in the nano-protuberance structures 12n, the nano-protuberance structures 12n, which may have a hydrophilic surface property, may have an even improved hydrophilic surface property.

The nano-protuberance structures 12n may have an ultra-hydrophilic surface property whereby a contact angle with respect to water is equal to or less than 20 degrees, due to a chemical combination with the inorganic particles 12n" giving a hydrophilic property to a surface of a substrate on which the nano-protuberance structures 12n are formed.

The collecting net 12 having such an ultra-hydrophilic surface has very high surface energy, and thus, may have an oleophilic property with respect to oil having low surface energy. However, in the water, oil is not absorbed into the collecting net 12 and the collecting net 12 has superoleophobicity whereby the oil maintains a sphere bubble shape. Accordingly, in the water, the nano-protuberance structures 12n may have a great contact angle with respect to oil in the water. Here, the contact angle may be, for example, equal to or higher than 140 degrees.

Figure 14:
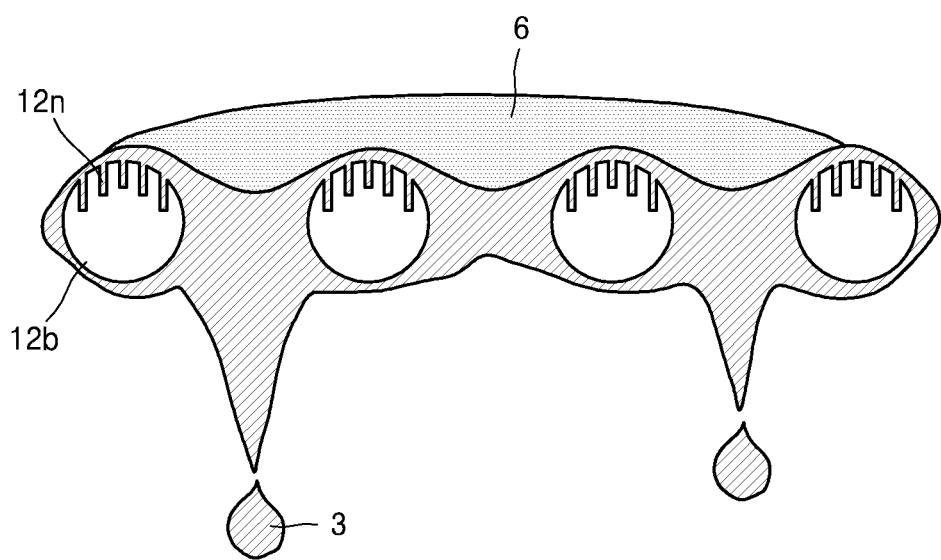
FIG. 14 is a cross-sectional view of a section of a portion of a fence of an oil-collecting system according to another embodiment.

FIG. 14 is a cross-sectional view of a structure of a section of a portion of an oil-collecting system according to another embodiment A fence of the oil-collecting system according to the embodiment illustrated in FIG. 14 may include the plurality of nano-protuberance structures 12n formed as recesses on a surface of the mesh 12b including a porous material.

The fence may have an ultra-hydrophilic property due to the nano-protuberance structures 12n, and thus, when a liquid 3, such as water, and the material 6, such as oil, contact the fence, the liquid 3 strongly adheres to the mesh 12b because the water contacts the hydrophilic porous surface of the mesh 12b. Accordingly, a water screen is formed on a surface of the fence.

The material 6 may not pass through pores of the fence, due to repulsion of the water screen on the surface of the mesh 12b, and thus, the material 6 may be collected by the fence.

The structure of the mesh 12b included in the fence 10 according to the embodiments illustrated in FIGS. 10 through 14 may be likewise applied to the filter 25 of the oil-collecting apparatus 20 and the porous layer 30f of the storage 30.

As described above, according to the oil-collecting system including the oil-collecting apparatus 20 according to the one or more of the above embodiments, the material 6 collected by the fence 10 while the ship sails at a high speed and pulls the fence 10 may be quickly collected and withdrawn by the oil-collecting apparatus 20.

Also, the oil-collecting apparatus 20 may collect the material 6 via the operation of the filter 25 without depending on an external power supply, and thus, it is not necessary to mount an additional power device in a ship or the oil-collecting system, in order to operate the oil-collecting apparatus 20 or the oil-collecting system.

In addition, the filter 25 of the body 21 of the oil-collecting apparatus 20 may include a porous material so as to be hydrophilic, and the nano-protuberance structures 12n may be provided on the surface of the filter 25. Thus, a concentration of oil in the liquid having passed through the filter 25 is significantly decreased, and thus, water highly purified while having passed through the oil-collecting apparatus 20 may be directly discharged.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An oil-collecting apparatus comprising:
   a body comprising an inlet through which a liquid is introduced, a first outlet through which purified water generated from the liquid introduced through the inlet is discharged, and a second outlet through which materials collected from the liquid are discharged;
   a filter arranged at the first outlet of the body and generating the purified water by collecting the materials included in the liquid by allowing the liquid introduced through the inlet to pass therethrough; and
   a bulkhead arranged in a space among the inlet, the first outlet, and the second outlet, in the body, so as to form a first compartment connected to the inlet and a second compartment connected to the first outlet and the second outlet, and comprising a path for connecting the first compartment to the second compartment,
   a surface of the bulkhead toward the inlet including an inclined plane inclined with respect to a bottom surface of the body.

2. The oil-collecting apparatus of claim 1, wherein the filter comprises a porous mesh surface-processed to be hydrophilic.

3. The oil-collecting apparatus of claim 2, wherein the mesh comprises a core of about 10 to about 500 meshes, a porous layer arranged on a surface of the core, a plurality of nano-protuberance structures arranged on a surface of the porous layer and comprising a polymer material, wherein the plurality of nano-protuberance structures have a diameter of about 1 to about 100 nm, a length of about 1 to about 10,000 nm, and an aspect ratio of about 1 to about 50, and an inorganic particle arranged at an end of at least one of the plurality of nano-protuberance structures.

4. The oil-collecting apparatus of claim 3, wherein the porous layer comprises a hydrophilic polymer,
   the core comprises a metal, a plastic, or a combination thereof, and
   the inorganic particle comprises at least one of Ti, Cu, Au, Ag, Cr, Pt, Fe, Al, Si, an alloy thereof, and an oxide thereof.

5. The oil-collecting apparatus of claim 1, further comprising a merging portion arranged at the path and merging the materials included in the liquid passing through the path.

6. The oil-collecting apparatus of claim 5, wherein the merging portion comprises a plurality of pipes arranged in parallel to one another, and
   an end of each of the plurality of pipes is connected to the first compartment, and another end of each of the plurality of pipes is connected to the second compartment.

7. The oil-collecting apparatus of claim 1, wherein the body further comprises a top surface,
   an end of the bulkhead is connected to the top surface,
   another end of the bulkhead extends toward the bottom surface, and
   the path is formed at the other end of the bulkhead.

8. The oil-collecting apparatus of claim 7, wherein at least a portion of the first outlet is connected to the bottom surface of the body, and
   the inlet and the second outlet are formed at a location distanced apart from the bottom surface of the body toward the top surface.

9. An oil-collecting system comprising:
   a fence comprising a floating member floating on a surface of a liquid and a collecting net connected to the floating member and collecting materials included in the liquid;
   an oil-collecting apparatus connected to the fence and comprising:
      a body comprising an inlet through which the materials collected by the fence along with the liquid are introduced, a first outlet through which purified water generated from the liquid introduced through the inlet is discharged, and a second outlet through which the materials collected from the liquid are discharged;
      a filter arranged at the first outlet of the body and generating the purified water by collecting the materials included in the liquid by allowing the liquid introduced through the inlet to pass therethrough; and
      a bulkhead arranged in a space among the inlet, the first outlet, and the second outlet, in the body, so as to form a first compartment connected to the inlet and a second compartment connected to the first outlet and the second outlet, and comprising a path for connecting the first compartment to the second compartment, a surface of the bulkhead toward the inlet including an inclined plane inclined with respect to a bottom surface of the body; and a storage connected to the second outlet of the oil-collecting apparatus and accommodating the materials discharged through the second outlet.

10. The oil-collecting system of claim 9, wherein the filter comprises a porous mesh surface-processed to be hydrophilic.

11. The oil-collecting system of claim 10, wherein the mesh comprises a core of about 10 to about 500 meshes, a porous layer arranged on a surface of the core, a plurality of nano-protuberance structures arranged on a surface of the porous layer and comprising a polymer material, wherein the plurality of nano-protuberance structures have a diameter of about 1 to about 100 nm, a length of about 1 to about 10,000 nm, and an aspect ratio of about 1 to about 50, and an inorganic particle arranged at an end of at least one of the plurality of nano-protuberance structures.

12. The oil-collecting system of claim 11, wherein the porous layer comprises a hydrophilic polymer, the core comprises a metal, a plastic, or a combination thereof, and the inorganic particle comprises at least one of Ti, Cu, Au, Ag, Cr, Pt, Fe, Al, Si, an alloy thereof, and an oxide thereof.

13. The oil-collecting system of claim 9, wherein the oil-collecting apparatus further comprises a merging portion arranged at the path and merging the materials included in the liquid passing through the path.

14. The oil-collecting system of claim 13, wherein the merging portion comprises a plurality of pipes arranged in parallel to one another, and an end of each of the plurality of pipes is connected to the first compartment, and another end of each of the plurality of pipes is connected to the second compartment.

15. The oil-collecting system of claim 9, wherein the body further comprises a top surface, an end of the bulkhead is connected to the top surface, another end of the bulkhead extends toward the bottom surface, and the path is formed at the other end of the bulkhead.

16. The oil-collecting system of claim 15, wherein at least a portion of the first outlet is connected to the bottom surface of the body, and the inlet and the second outlet are formed at a location distanced apart from the bottom surface of the body toward the top surface.

17. The oil-collecting system of claim 9, wherein the collecting net comprises a porous mesh, wherein the porous mesh is surface-processed to be hydrophilic and comprises:

a core having a mesh shape;

a porous layer arranged on a surface of the core;

a plurality of nano-protuberance structures arranged on a surface of the porous layer and comprising a polymer material, wherein the plurality of nano-protuberance structures have a diameter of about 1 to about 100 nm, a length of about 1 to about 10,000 nm, and an aspect ratio of about 1 to about 50; and an inorganic particle arranged at an end of at least one of the plurality of nano-protuberance structures.

18. The oil-collecting system of claim 9, wherein the storage comprises a porous layer surface-processed to be hydrophilic and comprising a polymer nano-protuberance structure having a diameter of about 1 to about 100 nm, a length of about 1 to about 10,000 nm, and an aspect ratio of about 1 to about 50.

* * * * *